United States Patent
Lejeune et al.

(10) Patent No.: US 9,538,124 B2
(45) Date of Patent: *Jan. 3, 2017

(54) ROOT EVALUATION

(75) Inventors: Pierre Lejeune, Tilff (BE); Willem Broekaert, Dilboek (BE); Frederik Leyns, Oosterzele (BE); Frederik Dhont, Deinze (BE)

(73) Assignee: CropDesign N.V., Zwijnaarde (BE)

( * ) Notice: Subject to any disclaimer, the term of this patent is extended or adjusted under 35 U.S.C. 154(b) by 468 days.

This patent is subject to a terminal disclaimer.

(21) Appl. No.: 13/615,895

(22) Filed: Sep. 14, 2012

(65) Prior Publication Data

US 2013/0070081 A1 Mar. 21, 2013

Related U.S. Application Data

(63) Continuation of application No. 11/663,010, filed as application No. PCT/EP2005/054466 on Sep. 8, 2005, now Pat. No. 8,341,880.

(30) Foreign Application Priority Data

Sep. 16, 2004 (EP) .................................... 04104496

(51) Int. Cl.
| | | |
|---|---|---|
| A01C 1/00 | (2006.01) | |
| H04N 7/00 | (2011.01) | |
| A01G 1/00 | (2006.01) | |
| A01G 9/00 | (2006.01) | |
| A01G 31/00 | (2006.01) | |

(52) U.S. Cl.
CPC ............... *H04N 7/002* (2013.01); *A01C 1/00* (2013.01); *A01G 1/00* (2013.01); *A01G 9/00* (2013.01); *A01G 31/00* (2013.01); *Y02P 60/216* (2015.11)

(58) Field of Classification Search
CPC ........................................................ A01C 1/00
USPC ............................... 47/58.1 R, 58.1 SE, 66.7
See application file for complete search history.

(56) References Cited

U.S. PATENT DOCUMENTS

| | | |
|---|---|---|
| 2,244,677 A | 6/1941 | Cornell |
| 3,063,195 A | 11/1962 | Ravich |
| 3,824,736 A | 7/1974 | Davis |
| 4,015,366 A | 4/1977 | Hall, III |
| 4,035,949 A | 7/1977 | Ruthner |

(Continued)

FOREIGN PATENT DOCUMENTS

| | | |
|---|---|---|
| DE | 80 11 661 U1 | 5/1983 |
| DE | 3906215 A1 | 8/1990 |

(Continued)

OTHER PUBLICATIONS

Dong, S., et al., "A Scanner-Based Root Image Acquisition Technique for Measuring Roots on a Rhizotron Window", HortScience, 2003, vol. 38, No. 7, pp. 1385-1388.

(Continued)

*Primary Examiner* — David Parsley
(74) *Attorney, Agent, or Firm* — Drinker Biddle & Reath LLP (57) ABSTRACT

A method is provided for evaluating plant roots, comprising (i) growing a plant in a substantially transparent container charged with a particulate, non-transparent growing medium; and (ii) evaluating plant roots through the transparent container by digital imaging. An apparatus for evaluating plant roots in a high throughput manner is also provided.

34 Claims, 3 Drawing Sheets

(56) References Cited

U.S. PATENT DOCUMENTS

| | | | |
|---|---|---|---|
| 4,454,806 A | 6/1984 | Schultz | |
| 4,481,893 A | 11/1984 | Qvarnström | |
| 4,570,380 A | 2/1986 | Ray et al. | |
| 4,628,631 A | 12/1986 | Van Wingerden | |
| 4,750,035 A | 6/1988 | Chang et al. | |
| 4,950,166 A | 8/1990 | Williams | |
| 5,013,658 A | 5/1991 | Dooner et al. | |
| 5,247,761 A | 9/1993 | Miles et al. | |
| 5,253,302 A | 10/1993 | Massen | |
| 5,394,646 A | 3/1995 | Sumiyoshi et al. | |
| 5,523,231 A | 6/1996 | Reeve | |
| 5,536,901 A | 7/1996 | Greaves et al. | |
| 5,710,367 A | 1/1998 | Kindiger et al. | |
| 5,723,596 A | 3/1998 | Cramer et al. | |
| 5,735,077 A | 4/1998 | Warfield | |
| 5,741,684 A | 4/1998 | Fabijanski et al. | |
| 5,750,386 A | 5/1998 | Conkling et al. | |
| 5,764,819 A | 6/1998 | Orr et al. | |
| 5,780,709 A | 7/1998 | Adams et al. | |
| 5,864,984 A | 2/1999 | McNertney | |
| 5,878,527 A | 3/1999 | Valstar | |
| 5,941,019 A | 8/1999 | Guarriello, Sr. et al. | |
| 5,943,818 A | 8/1999 | Fruehwirth | |
| 6,164,537 A | 12/2000 | Mariani et al. | |
| 6,230,440 B1 | 5/2001 | Deutsch | |
| 6,247,269 B1 | 6/2001 | Valiquette | |
| 6,298,598 B1 | 10/2001 | Wach et al. | |
| 6,483,434 B1 | 11/2002 | Umiker | |
| 6,505,425 B1 | 1/2003 | Gilbert | |
| 6,506,964 B1 | 1/2003 | Carolo | |
| 6,646,264 B1 | 11/2003 | Modiano et al. | |
| 6,701,665 B1 | 3/2004 | Ton et al. | |
| 6,706,989 B2 | 3/2004 | Hunter et al. | |
| 6,745,127 B2 | 6/2004 | Crosby | |
| 6,882,740 B1 | 4/2005 | McDonald, Jr. et al. | |
| 7,278,236 B2 | 10/2007 | McDonald et al. | |
| 7,367,458 B2 | 5/2008 | Leyns et al. | |
| 7,403,855 B2 | 7/2008 | Fuessley et al. | |
| 7,506,472 B2 | 3/2009 | Leyns et al. | |
| 7,697,133 B2 | 4/2010 | Leyns et al. | |
| 7,845,111 B2 | 12/2010 | Dillen et al. | |
| 7,866,091 B2 | 1/2011 | Dillen et al. | |
| 8,209,903 B2 | 7/2012 | Dillen et al. | |
| 8,341,880 B2 * | 1/2013 | Lejeune et al. | 47/58.1 R |
| 8,600,117 B2 * | 12/2013 | Li et al. | 382/110 |
| 2002/0066418 A1 | 6/2002 | Fearing et al. | |
| 2002/0144458 A1 | 10/2002 | Hunter et al. | |
| 2003/0061763 A1 | 4/2003 | Weder et al. | |
| 2003/0126791 A1 | 7/2003 | Weder | |
| 2003/0174046 A1 | 9/2003 | Abrams | |
| 2003/0221212 A1 | 11/2003 | Tomes et al. | |
| 2004/0088916 A1 | 5/2004 | Ton et al. | |
| 2004/0122592 A1 | 6/2004 | Fuessley et al. | |
| 2004/0163308 A1 | 8/2004 | Uchiyama | |
| 2004/0200145 A1 | 10/2004 | Egan | |
| 2004/0200146 A1 | 10/2004 | Leyns et al. | |
| 2004/0201454 A1 | 10/2004 | Waterhouse et al. | |
| 2005/0108608 A1 | 5/2005 | Chee Hong | |
| 2006/0150490 A1 | 7/2006 | Dillen et al. | |
| 2007/0186313 A1 | 8/2007 | Lightner et al. | |
| 2008/0297790 A1 | 12/2008 | Leyns et al. | |
| 2009/0035782 A1 | 2/2009 | Dillen et al. | |
| 2011/0107665 A1 | 5/2011 | Dillen et al. | |
| 2011/0167721 A1 | 7/2011 | Lejeune et al. | |
| 2012/0150341 A1 | 6/2012 | Leyns et al. | |
| 2012/0247016 A1 | 10/2012 | Dillen et al. | |

FOREIGN PATENT DOCUMENTS

| | | |
|---|---|---|
| DE | 4200001 A1 | 7/1993 |
| DE | 42 41 950 A1 | 5/1994 |
| DE | 1 95 30 797 A1 | 2/1997 |
| DE | 19845883 A1 | 5/1999 |
| DE | 19920920 A1 | 11/2000 |
| DE | 199 50 532 A1 | 7/2001 |
| EP | 0 302 183 A2 | 2/1989 |
| EP | 0919492 A1 | 6/1999 |
| EP | 1 157 961 A2 | 11/2001 |
| EP | 1154370 A2 | 11/2001 |
| EP | 1198985 A1 | 4/2002 |
| EP | 1433377 A1 | 6/2004 |
| EP | 1862051 A2 | 12/2007 |
| FR | 2709636 A1 | 3/1995 |
| GB | 1 160 512 A1 | 8/1969 |
| GB | 1 576 010 | 10/1980 |
| GB | 2197574 A | 5/1988 |
| GB | 2305839 A | 4/1997 |
| JP | S63-296634 A | 12/1988 |
| JP | H3-251123 A | 11/1991 |
| JP | 10155366 | 6/1998 |
| WO | WO-95/32056 A1 | 11/1995 |
| WO | WO-00/56905 A2 | 9/2000 |
| WO | WO-00/63362 A1 | 10/2000 |
| WO | WO-01/77671 A1 | 10/2001 |
| WO | WO-02/21905 A1 | 3/2002 |
| WO | WO-2004/068934 A2 | 8/2004 |
| WO | WO-2006/029987 A1 | 3/2006 |
| WO | WO-2007/093444 A1 | 8/2007 |

OTHER PUBLICATIONS

Himmelbauer, M. L., et al., "Estimating Length, Average Diameter and Surface Area of Roots Using Two Different Image Analyses Systems", Plant and Soil, 2004, vol. 260, pp. 111-120.

Kuchenbuch, R. O., et al., "Image Analysis for Non-Destructive and Non-Invasive Quantification of Root Growth and Soil Water Content in Rhizotrons", J. Plant Nutr. Soil Sci., 2002, vol. 165, pp. 573-581.

"History of Program WinRHIZO" downloaded from http://www.regentinstruments.com/assets/winrhizo_mostrecent.html on Dec. 18, 2014.

Opposition Filed in EP 1 788 859 B1 by Bayer Intellectual Property GmbH with Machine English Translation Attached, Dec. 10, 2014.

Opposition Filed in EP 1 788 859 B1 by LemnaTec GmbH with Machine English Translation Attached, Dec. 18, 2014.

CropDesign, Information from CropDesign's webpage on or around Jul. 31, 2002.

International Search Report of PCT/EP2004/050085, mailed Aug. 30, 2004.

"Three Dimensional Imaging of Plant Roots in Situ with X-Ray Computed Tomography," Plant and Soil, 1997, vol. 189, No. 2, pp. 167-179.

Office Action Dated Feb. 19, 2013 Issued in Japanese Application No. 2006-502006.

Rigney, M. P., et al., "Machine Vision for Conifer Seedling Quality Control", New Forests, vol. 13, (1996), pp. 51-62.

Yang, Y-z, et al., "Review on the Proceeding of Automatic Seedlings Classification by Computer Vision", Journal of Forestry Research, vol. 13, No. 3, (2002), pp. 245-249.

Boyes, D.C., et al., "Growth Stage-Based Phenotypic Analysis of Arabidopsis: A Model for High Throughput Functional Genomics in Plants", The Plant Cell, vol. 13, (2001), pp. 1499-1510.

Press Release: "Targeted Growth and Crop Design Conclude Research Collaboration and License Agreement", Targeted Growth, Inc., CropDesign N.V., published May 9, 2001, pp. 1-2.

Lemnatec GMBH: "Lemnatec: Image processing in biology," [Online] Sep. 17, 2007, pp. 1-13, XP002558586.

Lemnatec GMBH: "Plant Phenotyping 3:31," Youtube—Lemnatec2008 Channel, [Online] Sep. 15, 2008, pp. 1-12, XP002558584.

Vandenhirtz, D.: "get an impression of your plants," 2008 International Meeting on Controlled Environment Agriculture; North American Committee on Controlled Environment Technology and Use (NCERA 101), [Online] Mar. 12, 2008, pp. 1-63, XP002558585.

Reuzeau, C., et al., "TraitMill: a Discovery Engine for Identifying Yield-Enhancement Genes in Cereals", Plant Gene and Trait, 2010, vol. 1, No. 1, pp. 1-6; Reprint of Publication in Molecular Plant Breeding, 2005, vol. 3, No. 5.

(56) References Cited

OTHER PUBLICATIONS

Frankard, V., et al., "From TraitMill: Transgenic Cereals with Increased Yield", Abstract of Poster Presentation in Plant Biology 2005, Annual Meeting of the American Society of Plant Biologists, Jul. 16-20, 2005, Seattle, Washington, USA.
Broekaert, W., "CropDesign," Presentation Slides Presented in ABIC 2004, Sep. 12-15, 2004, Köln, Germany.
Reuzeau, C., "CropDesign," Presentation Slides Presented in SDCMA, Oct. 25, 2004, San Diego, California, USA.
"CropDesign," Presentation Slides Presented in XIIIth Annual Molecular Biology Seminar, Feb. 24-25, 2005, Paris, France.
"CropDesign," Presentation Slides Presented in DIATOMICS kick-off, Mar. 2005, Paris, France.

* cited by examiner

FIGURE 1 (top) - FIGURE 2 (bottom)

FIGURE 3 (top) - FIGURE 4 (bottom)

FIGURE 5

ROOT EVALUATION

This application is a continuation of U.S. application Ser. No. 11/663,010, filed Mar. 15, 2007, which is a national stage application (under 35 U.S.C. §371) of PCT/EP2005/054466 filed Sep. 8, 2005, which claims the benefit of European application 04104496.7 filed Sep. 16, 2004. The entire content of each above-mentioned application is hereby incorporated by reference in entirety.

The present invention relates generally to the field of plant breeding and concerns a method for evaluating plant roots by growing plants in a substantially transparent container charged with a particulate, non-transparent growing medium and evaluating plant roots through the substantially transparent container by digital imaging. The invention also provides apparatus for evaluating plant roots, which apparatus is particularly suitable for evaluating, in a high throughput fashion, the roots of plants growing in a greenhouse.

Plant breeding starts in essence with the creation of genotypic variation among plants of a given species. The creation of genotypic variation relies on the production of genetic alterations that can be obtained by various techniques including recombination through classical crossing, chemical mutagenesis, radiation-induced mutation, somatic hybridisation, inter-specific crossing and genetic engineering. Following the creation of genotypic variation, selection of those genotypes having the most desirable agronomic phenotypes is performed. For example, plants may be selected for certain root phenotypes.

Despite the great importance of roots to the overall survivability of a plant, the evaluation of root systems, particularly that of mature root systems, is often hindered by technical limitations. In a field setting, a traditional method for evaluating root systems involves excavating the roots from the soil before performing any measurements; this means that evaluation may take place only once for any given plant. Furthermore, variation over short distances in the soil (due to, for example, soil composition, physical properties of the soil, availability of nutrients or the presence of microbial soil inhabitants) may also hinder root evaluation in a field setting.

Several methods are available for the non-destructive measurement of roots. One such method relies on the use of electrical capacitance which involves inserting electrodes in the plant (preferably the stem) and the substrate. This allows measurement of the electrical properties of the contact surface between the roots and the substrate, and from this the root mass is deduced. There are however disadvantages to this technique. For example: i) reliability is low due to difficulties associated with calibration (for example, varying water content of the substrate); ii) insertion of the electrode into the stem is difficult to automate, especially in plants with many stems (this applies to most cereals, for example wheat and rice); iii) the only information generated using this technique is an indication of root mass.

Another method for measuring roots in a non-destructive manner involves the use of X-rays or nuclear magnetic resonance (NMR), however these techniques can be extremely slow and expensive and are therefore generally not suitable for use where a high throughput is required.

A further method for measuring roots in a non-destructive manner involves the use of a ground-penetrating radar, however the low resolution associated with use of this technique makes the results difficult to interpret.

Although plant breeders are generally aware of the importance of root systems, the shortcomings associated with traditional methods for evaluating root systems means that plant breeders tend to focus their attention on the aboveground parts of plants, with little if any attention being paid to belowground parts. Much of the current knowledge of root function has been gained from studies of seedlings or inferred from observations to the plant canopy and soil profile.

The ability to evaluate plant roots without the disadvantages of the prior art would enable plant breeders to gain knowledge of, for example, the profile of an optimal root system and how it should be proportioned with respect to the rest of the plant. It would also be useful for breeders to understand what the most efficient root architecture for a given set of environmental conditions would be. For example, it is widely believed that plants with a more developed root system should have higher resistance to drought stress. However, many questions remain, such as the degree of development required, whether there are any penalties to the rest of the plant as a consequence of having a more developed root system and the optimum ratio of root to leaf area. The ability to evaluate plant roots without the disadvantages of the prior art would enable plant breeders to answer these and other such questions.

It is therefore an object of the present invention to provide means to evaluate plant roots which alleviate some of the aforementioned problems.

Therefore, according to the present invention, there is provided a method for evaluating plant roots, comprising (i) growing a plant in a substantially transparent container charged with a particulate, non-transparent growing medium; and (ii) and evaluating the plant roots through the substantially transparent container by digital imaging.

The substantially transparent container may be a pot, tray, or the like. Preferably, the container is a classical plant pot moulded of transparent material, such as a suitable plastics material. It is preferred to have one plant per pot. The transparent material preferably contains a (green) pigment to absorb substantially all wavelengths of light except those between 500 and 600 nanometres. This serves to suppress the light avoidance response of the roots and to avoid algal growth on the inner walls of the pots. In use, plant roots may be seen against the walls of the container. The container may consist substantially entirely of transparent material or may have only a transparent bottom.

The particulate, non-transparent growing medium may be any soil-like substrate (for example soil, compost, peat, sand, or the like, or a combination thereof). The use of a defined substrate such as potting soil or rock wool may further reduce variations caused by the heterogeneity of the soil. Furthermore, the growing of greenhouse plants on a defined substrate allows the amount of water and nutrients to be given to the plants to be controlled.

According to the method of the invention, plant roots are evaluated by digital imaging, which facilitates the handling of large samples (of the order of say up to several tens of thousands). It is preferred that plants are evaluated in an automated fashion using at least one camera. The plants may be presented (sequentially) to fixed camera(s), or the camera(s) may be moveable to plants in a fixed spot. According to a preferred aspect of the present invention, the plants are retrieved (for example from a location in the greenhouse or elsewhere) and the substantially transparent containers in which the plants are placed are presented sequentially to a camera arranged to record images of the roots. The plants are then returned to their original location, or to another location, all substantially without human intervention. There may be some degree of human intervention in the step of selecting the plant or series of plants for evaluation, but this may also be computerised. In a preferred process, a minimum of 500 plants per hour may be evaluated.

According to a second aspect of the present invention there is provided an apparatus for evaluating plant roots, comprising:
(i) a transporter means for movement of plants in substantially transparent containers charged with particulate, non-transparent growing medium; and
(ii) at least one camera; and optionally
(iii) a mechanical system for presenting the substantially transparent container to the at least one camera; and
(iv) algorithms for measuring root traits.

The transporter means is preferably a moving belt. An alternative embodiment may also be envisaged in which the at least one camera is moveable so as to record images of plants in a fixed spot. There is therefore provided apparatus for evaluating the roots of plants in substantially transparent containers charged with particulate, non-transparent growing medium, which apparatus comprises at least one movable camera arranged to record images of plant roots through said substantially transparent container.

Automated evaluation may further be aided by having several plants, or each plant, carry a unique identifier allowing information concerning those individual plants to be linked to their unique identifier in a computer. Preferably, the identifier is a transponder, but any other suitable identifier such as a barcode may be used. Information may be collected and stored concerning the plant species, the cultivar, parental information, presence/absence of a transgene, sowing date, root measurements (with a date stamp) and any other measurements or observations made on parts of the plant other than the roots, also with a date stamp. The information stored in a computer may be retrieved by appropriate software. A statistical analysis may be made to identify plants with differing root characteristics and to identify interesting traits.

Examples of interesting traits include: (i) increased root growth rate (this is useful to know since cultivars having rapidly developing root systems are more efficient at taking up water, minerals and other nutrients during the critical early stages in the plant life cycle and in case of water shortage); (ii) increased root length and thickness (longer, thicker roots have a higher capacity to penetrate hard substrates and provide better adaptation to compacted soil, especially in case of water shortage); (iii) increased root branching (highly branched root systems have a higher potential for efficient exploration of the soil layers); (iv) improved anchorage (root lodging reduces crop quality and yields; plants with sturdier root systems are less sensitive to root lodging).

The method of the invention may be performed on any plant. Preferred plants are cereals, such as rice, wheat, and corn.

The method of the invention is particularly suited to the breeding of plants in a greenhouse, the advantage being that plants are grown on a defined substrate, so that the amount of water and nutrients given to the plants can be controlled. The method of the invention is also particularly suited where a high throughput is required.

Preferably also, plants are selected for further breeding or for commercial use by comparing the phenotype characteristics of the plants.

The word "comprising" where used herein is intended to encompass the notion of "including" and the notion of "consisting essentially of".

The present invention will now be described with reference to the following drawings in which.

Each of FIGS. 1 to 4 is made up of three drawings in which the process of imaging plant roots is illustrated starting from the left hand drawing which shows the apparatus before imaging; the middle drawing which shows elements of the apparatus during imaging; and the drawing on the right hand side which shows elements of the apparatus after completion of imaging. The arrows indicate the direction of the movement of the mobile elements.

In order that the invention may become clearer there now follows a description to illustrate the invention by way of example and to be read with the accompanying drawings.

The First Embodiment of the Apparatus According to the Invention Comprises

Figure 1:
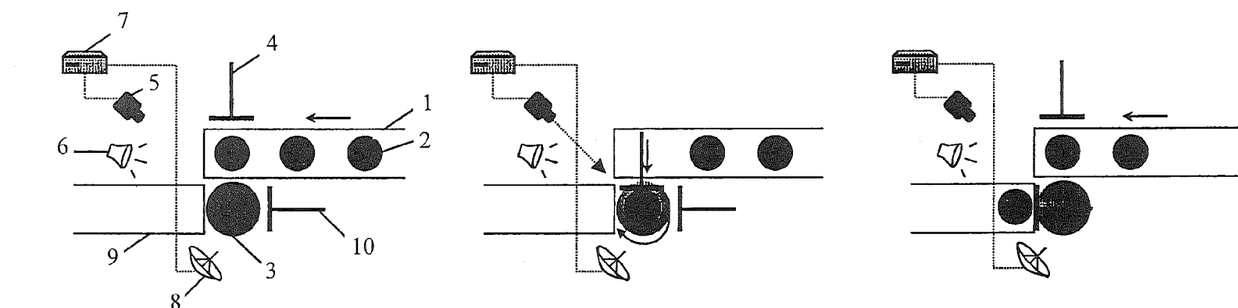
FIG. 1 is a diagrammatic representation (top view) of the apparatus according to a first embodiment of the invention.
Figure 2:
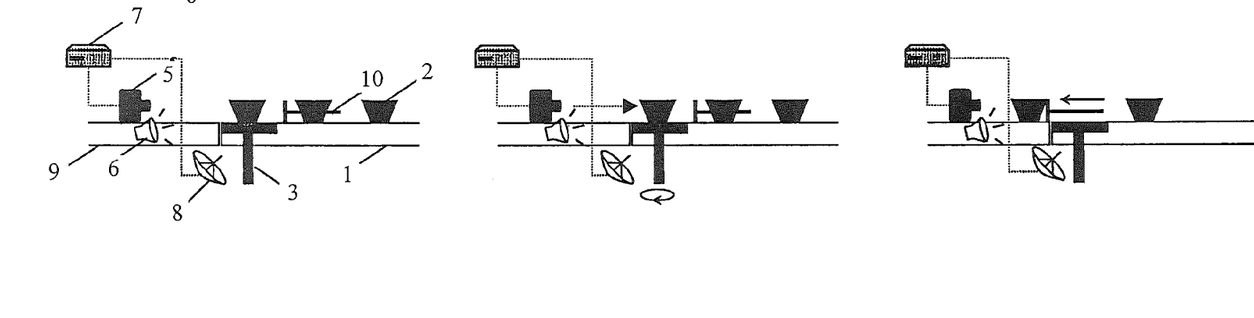
FIG. 2 is a diagrammatic representation (side view) of the apparatus according to a first embodiment of the invention.

A first transporter means (1), by which the plants in transparent pots are supported and moved to the station where images of the roots are recorded. Preferably, the transporter means is a moving belt. Containers (2) are plant pots in which one or more plants is growing in a medium selected for the purpose. The pots are of a transparent plastic or the like. A rotating plate (3) is shown, on which the potted plants can be placed and rotated along a central vertical axis. A first mechanical device, referred to as "pusher" (4) has the capability to move the potted plant from the first transporter means (1) onto rotating plate (3). A camera (5) for recording pictures from the side surface of the pots is placed horizontally at a suitable distance from the rotating plate (3). The camera is a "line-scan" type and can output images in a digital format. Two-dimensional digital pictures are constituted by stacked lines of pixels, the first dimension being the length of the lines and the second dimension the number of lines. One property of line-scan cameras is that they record single lines of pixels at regular time intervals and compile them during a specified period of time. According to this principle, it is possible to record an image of the surface of a circular object by rotating the object in front of a line-scan camera. An appropriate light source (6) placed horizontally at a suitable distance from the rotating plate (3) so as to illuminate in a uniform way the side surface of the pot.

A computer (7) is connected to the aforementioned camera and is equipped with appropriate programs for collecting, storing, and analysing the pictures produced by the camera. Reading means (8) allow reading of the identifier attached to the plant.

Preferably, the identifier is a transponder, but any other suitable system can be used. A second transporter means (9) transports the plant pots to their original location or to another location if desired. This transporter means is also a moving belt. A second mechanical device, referred to as "pusher" (10), has the capability to move the potted plants from the rotating plate (3) onto the second transporter means (9).

The process by which the root traits are evaluated in the first illustrative apparatus typically include the following steps:

The first transporter means (1) is set in motion in order to bring a potted plant (2) in front of the rotating plate (3). The first transporter means (1) is then stopped. The first pusher (4) is activated and pushes the potted plant onto the rotating plate (3). Alternatively, the action of placing the plant on the rotating plate may be performed manually or by a robotic arm with a suitable gripper to seize the plant and to move it to a pre-selected place. The potted plant is turned around in front of the line-scan camera (5) and the light-source (6) is switched on. Preferably, the light-source (6) is not switched off between each plant to ensure a stable illumination at each cycle of picture acquisition. The line-scan camera (5) starts recording a picture as soon as the rotating plate (3) is turning and stops after a complete revolution. The identifier attached to the potted plant is read by the identifier reader (8) and sent through a data cable connection to the computer (7). The camera (5) sends the recorded picture through a data cable connection to the computer (7). The identifier of the plant is linked to the image at the moment the image is stored and analysed. Preferably, the identifier is incorporated in the name of the image file when the image file is stored, but any naming system can be used to name the images, provided that the link between the identifier and the image name is linked unequivocally in a computer database. The root features are deduced from the picture by means of appropriate software and the result is stored in a computer database with a link to the identifier of the plant. The second pusher (10) pushes the potted plant onto the second transporter means (9) which is then set in motion to transport the potted plant. Alternatively, the action of moving the plant back from the rotating plate to the second transporter means can be performed either manually or by a robotic arm with a suitable gripper that can seize the plant and move it to pre-selected places. The above steps are repeated until all the plants placed on the first transporter means have been evaluated.

The Second Illustrative Apparatus Comprises

Figure 3:
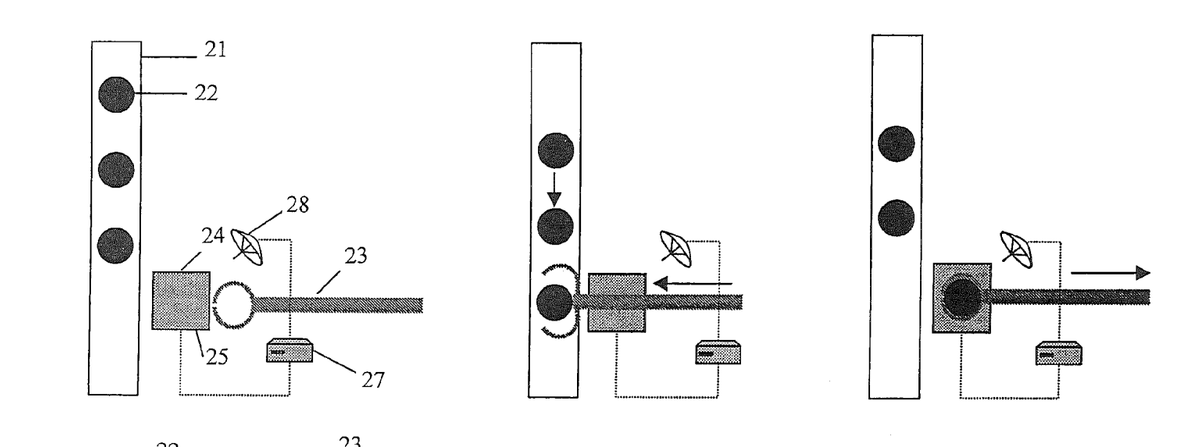
FIG. 3 is a diagrammatic representation (top view) of the apparatus according to a second embodiment of the invention.
Figure 4:
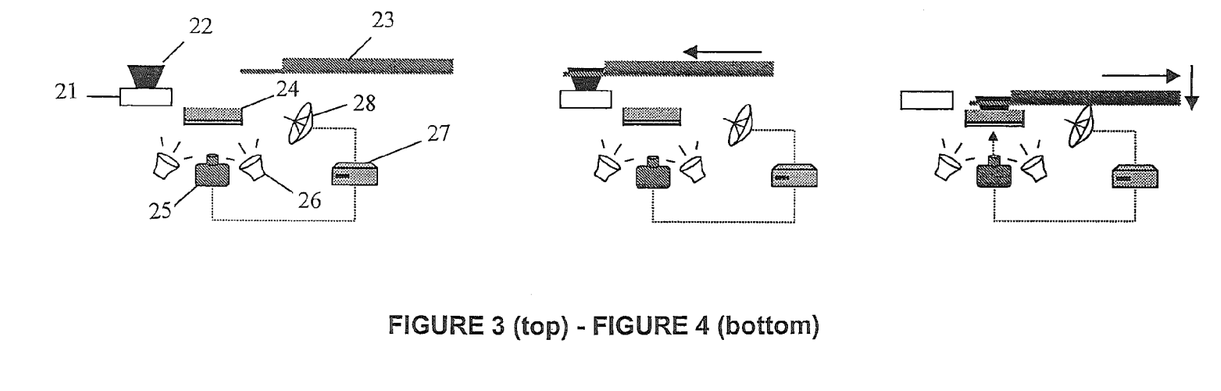
FIG. 4 is a diagrammatic representation (elevated side view) of the apparatus according to a second embodiment of the invention.

A transporter means (21) on which plant pots are supported and moved to a station where images of the roots are recorded. Preferably, the transporter means is a moving belt. Containers (22) in the form of plant pots in which one or more plants is growing in a medium selected for the purpose. The material of the pots is preferably a transparent plastic or the like. A mechanical device, referred to as "gripper-arm" (23) that has the capability to seize the potted plants from the transporter means (21) and to move them over short distances, for example between 10 and 50 cm, both horizontally in the direction perpendicular to the transporter means (21) and vertically in the direction perpendicular to the ground. A water-basin (24) with a transparent bottom is provided. The water-basin can be of any shape, but its length and width must be at least greater than the diameter of the pots. Preferably, the height of the water basin should not exceed the height of the pots. A camera (25) placed below the water-basin (24) records pictures of the bottom surface of the pots. T Camera (25) outputs images in a digital format. Appropriate light sources (26) are placed at a suitable distance below the water-basin (24) so as to illuminate in a uniform way the bottom surface of the pot. A computer (27) is connected to the aforementioned camera, and equipped with the appropriate programs for collecting, storing, and analysing the pictures produced by the camera. Means to read the identifier attached to the plant (28) are provided. Preferably, this is a transponder, but any other suitable system may be used.

The process by which the root traits are evaluated in the second illustrative apparatus typically include the following steps:

The water basin (24), camera (25), and gripper-arm (23) are installed at a suitable distance from the transporter means (21) on which the potted plants (22) are placed for transportation. The transporter means (21) is set in motion to bring a plant in front of the water basin (24). The transporter means (21) is then stopped.

The gripper arm (23) is activated and seizes the plant pot placed in front of the water basin (24). The plant pot is moved by means of the gripper arm (23), first horizontally above the water basin (24), then vertically downwards into the water basin (24). Plunging the pot into the water basin removes dust, soil or condensed water from the bottom surface of the pot so that image quality is improved. Preferably, a continuous stream of water is maintained in the water basin to accelerate the cleaning process. Alternatively, the action of placing the plant in the basin may be performed manually. Alternatively, the water basin may be a part of the transporter means and the pot may be guided over the basin by means of a robotic arm and lateral rails. The identifier attached to the potted plant is read by the identifier reader (28) and sent through a cable connection to a computer (27). The camera (25) located under the water basin records an image of the bottom of the pot. The image is sent through a cable connection to a computer (27). The identifier of the plant is linked to the image at the moment the image is stored and analysed. Preferably, the identifier is written in the name of the image file when the image file is stored, but any naming system can be used to name the images, provided that the link between the identifier and the image name is linked in a computer database. The root features are deduced from the picture by means of appropriate software and the result is stored in a computer database with a link to the identifier of the plant. The plant pot is placed back on the transporter means (21) which is set in motion again in order to bring the next plant in front of the water basin (24). Alternatively, the action of placing the plant back on the transporter means can be performed manually. The aforementioned Steps are repeated until all the plants placed on the transporter means (21) have been evaluated.

The Third Illustrative Apparatus Comprises

Figure 5:
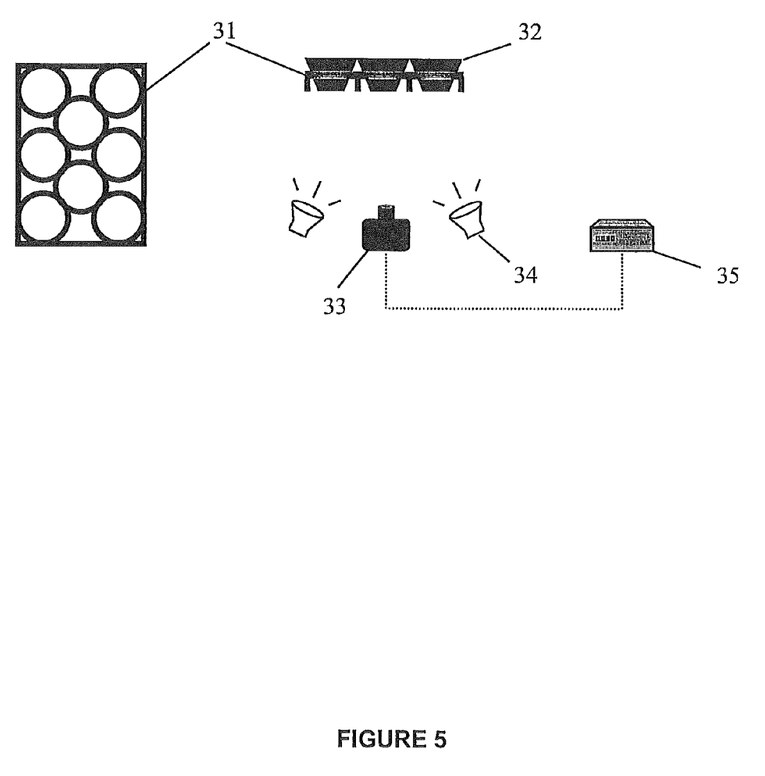
FIG. 5 is a diagrammatic representation of the apparatus according to a third embodiment of the invention.

A holder, or tray, (31), by which the plant pots are supported and moved to the station where images of the roots are recorded. Preferably, the holder dimensions should comply with industrial standards such as the popular "Danish trays". Typically, the holder would be approx. 50 cm long by 30 cm wide and 5 to 10 cm high. The transport and handling of the trays may be performed using transporter means and robotized mechanical devices that are commercially available for the horticultural industry. In the present example, such a tray consists of a plastic frame with 8 circles where pots of 12 cm diameter can be inserted. The system can be scaled up or down for use with different species of plants. Containers (32) in the form of plant pots in which one or more plants is growing in a medium selected for the purpose. The pots are of a transparent plastic material or the like. A digital imaging station comprising an appropriate camera (33) for recording pictures of the bottom surface of all the pots in the holder, placed vertically at a suitable distance from the plane where the pots will be positioned. Preferably, the camera can output images in a digital format. Appropriate light sources (34) placed at a suitable distance below the plane where the pots will be positioned so as to illuminate in a uniform way the bottom surface of the pots. A computer (35), connected to the aforementioned camera, and equipped with the appropriate programs for collecting, storing, and analysing the pictures produced by the camera. In this example, each picture needs to be divided in sectors corresponding to each individual plant. In this example, the identification of the individual plants may be carried out using a readable tag, preferably in the form of a "bar code" or even more preferably in the form of a "matrix code" under the bottom of each individual pot since transponders may not be suitable for use with plants in such close proximity to one another. Alternatively, the readable tag may used to identify the tray; in this case, the individual plants on the tray could be identified by their positions on the tray. Most preferably, the tag and the glue, or any other mean used to attach the tag to the bottom of the pot or tray, should be resistant to water and to mechanical stresses.

The process by which the root traits are evaluated in the third illustrative apparatus typically include the following steps:

The holders (31) supporting the transparent pots (32) are brought to the imaging station and placed manually, or using mechanical transport systems available in the horticultural industry, above the camera (33), at a suitable distance from the focal plane of the camera. The camera (33) located under the holder records a picture of the bottoms of the pots. If a higher resolution is needed, the camera can record the image of one individual pot at a time, which requires sequential movements of the tray or the camera so that for each successive pot the vertical axis of the pot is made perpendicular to the focal plane of the camera. Several cameras may be used, for example one for each pot. The image is sent through a cable connection to a computer (35). The identifier of the plant, which is present on the picture is recognized by means of software and is linked to the image at the moment the image is stored and analysed. Preferably, the identifier is written in the name of the image file when the image file is stored, but any naming system can be used to name the images, provided that the link between the identifier and the image name is linked in a computer database. The root features are deduced from the picture, by means of appropriate software, and the result is stored in a computer database with a link to the identifier of the plant. The holder containing the plants is returned to its original location, either manually or using mechanical transport systems available in the horticultural industry.

The invention claimed is:

1. A method for evaluating roots of a potted plant in a non-destructive manner to identify a plant possessing a trait of interest, comprising:
   (i) providing a potted plant grown in a particulate, non-transparent growing medium in a substantially transparent container for imaging;
   (ii) evaluating roots of the potted plant through the transparent container and the particulate, non-transparent growing medium by using a camera that can output two-dimensional images in a digital format;
   (iii) collecting digital images of the roots and storing information from the digital images in a computer; and
   (iv) measuring root traits by analyzing the information with algorithms to identify a plant possessing a trait of interest,
   wherein the roots of the potted plant are evaluated in a non-destructive manner to the plant and the roots, and
   wherein the potted plant is retrieved from an original location for imaging and returned to its original location or to another location after imaging.

2. The method of claim 1, wherein said particulate, non-transparent growing medium comprises soil.

3. The method of claim 1, wherein said transparent container contains a pigment that absorbs all light wavelengths except between 500 and 600 nanometers.

4. The method of claim 1, wherein the container is a plant pot.

5. The method of claim 1, wherein the images are taken from below or from the side of the container.

6. The method of claim 5, wherein the images are taken from the side of the container, and wherein the digital images are obtained by rotating the plant along a central vertical axis.

7. The method of claim 6, wherein the plant is rotated using a rotating plate.

8. The method of claim 1, wherein the camera is a line-scan camera.

9. The method of claim 1, wherein the root traits measured comprise root growth rate, root length, root thickness, root branching, and/or anchorage.

10. The method of claim 1, wherein the evaluation of plant roots is accomplished in a high throughput manner or in an automated manner.

11. The method of claim 1, wherein said plant is provided with a unique identifier.

12. The method of claim 11, wherein information concerning the plant is associated with the unique identifier.

13. The method of claim 11, wherein the unique identifier is a transponder.

14. A method for breeding plants in a greenhouse, comprising:
   (i) growing plants and evaluating roots of the plants according to the method of claim 1;
   (ii) identifying plants with different root traits, and
   (iii) selecting plants having desirable root traits by comparing the root traits of the plants.

15. A method for evaluating roots of a potted plant in a non-destructive manner to identify a plant possessing a trait of interest, comprising:
   (i) providing a potted plant grown in a particulate, non-transparent growing medium comprising soil in a substantially transparent container;
   (ii) placing the potted plant in a position for image capturing with a camera that can output two-dimensional images in a digital format;
   (iii) digital imaging roots of the potted plant through the transparent container and the particulate, non-transparent growing medium;
   (iv) collecting digital images of the roots and storing information from the digital images in a computer; and
   (v) measuring root traits by analyzing the information with algorithms to identify a plant possessing a trait of interest
   wherein the roots of the potted plant are evaluated in a non-destructive manner to the plant and the roots, and
   wherein the potted plant is retrieved from an original location for imaging and returned to its original location or to another location after imaging.

16. The method of claim 15, wherein said transparent container contains a pigment that absorbs all light wavelengths except between 500 and 600 nanometers.

17. The method of claim 15, wherein the container is a plant pot.

18. The method of claim 15, wherein the images are taken from below or from the side of the container.

19. The method of claim 17, wherein the one or more plants are imaged from the side of the container, while rotating the container along a vertical axis.

20. The method of claim 15, wherein the one or more plants are rotated using a rotating plate.

21. The method of claim 15, wherein the camera is a line-scan camera.

22. The method of claim 15, wherein the root traits measured comprise root growth rate, root length, root thickness, root branching, and/or anchorage.

23. The method of claim 15, wherein the evaluation of plant roots is accomplished in a high throughput manner or in an automated manner.

24. The method of claim 15, wherein information concerning the plant is associated with a unique identifier.

25. The method of claim 24, wherein the unique identifier is a transponder.

26. A method for breeding plants in a greenhouse, comprising:
   (i) growing plants and evaluating roots of the plants according to the method of claim 15;
   (ii) identifying plants with different root traits, and
   (iii) selecting plants having desirable root traits by comparing the root traits of the plants.

27. A method for evaluating roots of a potted plant in a non-destructive manner to identify a plant possessing a trait of interest, comprising:
   (i) providing a potted plant grown in a particulate, non-transparent growing medium comprising soil in a container for imaging, wherein at least the bottom of said container is substantially transparent;
   (ii) placing the potted plant into a water basin, wherein said water basin has a transparent bottom and is placed above a camera that can output images in a digital format;
   (iii) digital imaging roots of the potted plant through the bottom of the container;
   (iv) collecting digital images of the roots and storing information from the digital images in a computer; and
   (v) measuring root traits by analyzing the information with algorithms to identify a plant possessing a trait of interest,
   wherein the roots of the potted plant are evaluated in a non-destructive manner to the plant and the roots, and
   wherein the potted plant is retrieved from an original location for imaging and returned to its original location or to another location after imaging.

28. The method of claim 27, wherein said transparent container contains a pigment that absorbs all light wavelengths except between 500 and 600 nanometers.

29. The method of claim 27, wherein the evaluation of plant roots is accomplished in a high throughput manner or in an automated manner.

30. The method of claim 27, wherein the camera is a line-scan camera.

31. The method of claim 27, wherein the root traits measured comprise root growth rate, root length, root thickness, root branching, and/or anchorage.

32. The method of claim 27, wherein information concerning the plant is associated with a unique identifier.

33. The method of claim 32, wherein the unique identifier is a transponder.

34. A method for breeding plants in a greenhouse, comprising:
   (i) growing plants and evaluating roots of the plants according to the method of claim 27;
   (ii) identifying plants with different root traits, and
   (iii) selecting plants having desirable root traits by comparing the root traits of the plants.

* * * * *